Patented Oct. 5, 1943

2,331,154

UNITED STATES PATENT OFFICE 2,331,154

PROCESS OF HYDROGENATING LIGNIN

Homer Adkins, Madison, Wis.

No Drawing. Application February 7, 1939,
Serial No. 255,017

8 Claims. (Cl. 260—124)

This invention relates to a process of hydrogenating lignin whereby valuable products of lower molecular weight are obtained.

Lignin, as is well known, is a waste product of the paper industry. Various proposals have been made for utilizing it commercially but as yet no widespread use for it has been found. The object of this invention is to provide a process for the hydrogenolysis and hydrogenation of lignin to convert it into oxygenated, organic compounds of lower molecular weight.

It has been found that lignin reacts with hydrogen in the presence of a copper oxide-containing, hydrogenation catalyst to produce a mixture of alcoholic compounds that consists essentially of methanol, 4-n-propyl cyclohexanol-1, 3(4-hydroxy cyclohexyl)-propanol-1, and 4-n-propyl cyclohexandiol. This mixture may be obtained in yields of over 70% based on the weight of the lignin hydrogenated and may be separated into its components by means of distillation. There is also obtained a mixture of other glycols and ethers of higher molecular weight.

The reaction is carried out in the presence of a solvent which is inert to hydrogen, such as dioxane, at elevated temperatures and pressures and preferably is continued until hydrogen is no longer absorbed. This may require from one to twenty-four hours depending upon the conditions under which the reaction is carried out. The pressures used should usually be within the range of from 150 to 400 atmospheres and the temperatures from 250 to 300° C. but pressures of 100 atmospheres and temperatures of fifty degrees centigrade above or below these ranges may be used with satisfactory results.

I prefer to use a copper-chromium oxide hydrogenation catalyst prepared by one of the methods described by Connor, Folkers, and Adkins in the "Journal of the American Chemical Society" vol. 54 (1932, pp. 1138–1145) but may use other copper-containing hydrogenation catalysts as, for instance, those that may be used in the hydrogenation of esters to alcohols. Addition of barium, calcium or magnesium to the copper-chromite catalysts is of advantage in stabilizing the catalyst against reduction and consequent loss in effectiveness.

When lignin in a solvent is shaken with a catalyst and hydrogen under the conditions of pressure and temperature given above, as much as a gram mol of hydrogen may be absorbed by about 25 grams of lignin. The amount of hydrogen absorbed depends upon the origin and nature of the lignin used, as well as the method by which it is prepared. When absorption of hydrogen has ceased, the catalyst is separated by a suitable method, such as centrifuging. The products are then ready for separation. Methanol, water and solvent are first removed by distillation. The solvent is recovered and the methanol obtained as one of the reaction products. The remaining mixture may be subjected to vacuum distillation for recovery of products boiling over 100° C.

The lignin which is used may be obtained from any variety of wood. I have used samples of lignin extracted from aspen with acidified methanol, from beech with acetic acid, and from various hard and soft woods by the soda process, the sulfite process and the sulfuric acid process.

The yield of the various reaction products depends upon the variables which have already been mentioned, including origin of the lignin, method of extraction, type of catalyst, and conditions of hydrogenation. The proportion of the various products may be a function of the relative rates of hydrogenation and of hydrogenolysis, as well as structure of the lignins. If hydrogenation of unsaturated linkages precedes hydrogenolysis of linkages between two carbon atoms or between a carbon atom and an oxygen atom, then cleavage (hydrogenolysis) may not ensue because the unsaturated groups which favor such cleavage are no longer present. The relative rates of hydrogenation and hydrogenolysis are often quite sensitive to small changes in conditions.

Details of the process will be clearly evident from the following examples.

Example 1

Coarse sawdust from aspen (*Populus tremuloides*) was dehydrated and extracted with methanol containing 3% hydrogen chloride by weight. The lignin was purified by precipitation in water, re-solution in methanol, re-precipitation in water, solution in glacial acetic acid, and precipitation in water. Eighty grams of dry lignin was dissolved in dioxane and made up to 800 ml. The solution was subjected to hydrogenation in successive portions in a small vessel containing 7 grams of a copper-chromium oxide catalyst. Hydrogenation was admitted to a pressure of 220 atmospheres. The reaction vessel was then heated to 260° in 50 minutes and rocked to agitate the reaction mixture. On heating, the pressure increased to 400 atmospheres and then decreased as hydrogen was absorbed. After 22 hours the constancy of pressure indicated no further absorption, From the 80 gram sample of lignin there were obtained (1) 22 grams of methanol, (2) 9 grams of an alcohol boiling at 92–95° C. at 7 mm., (3) 3 grams of a glycol boiling at 107–110° C. at 1 mm., (4) 20 grams of a glycol boiling at 125–127° C. at 1 mm., (5) 18 grams of a mixture boiling at 130–260° C. at 1 mm., (6) 4 grams of intermediate fractions, and (7) 5 grams of compounds boiling above 260° at 1 mm. The alcohol was identified as 4-n-propyl cyclohexanol-1. The glycols found were 4-n-propyl cyclohexandiol-1-2, and 3-(4-hydroxy cyclohexyl)-propanol - 1. Other glycols and ethers of high molecular weight were also formed.

*Example 2*

Twenty-five grams of lignin, which had been extracted from beechwood by the acetic acid process, was taken up in 110 ml. of dioxane. Copper-chromite catalyst (7 grams) was then added and the mixture shaken. Hydrogen was run into the reaction vessel, which was heated to 260° C. and maintained at this temperature. The pressure reached about 300 atmosphéres at the start, decreasing during a period of seven hours. During this period about 0.5 mol of hydrogen reacted with the lignin. The products formed comprises monohydric alcohols, glycols and ethers such as identified in Example 1.

*Example 3*

A sample of 15 grams of lignin, which had been obtained commercially by the soda process, was dissolved in 125 ml. of dioxane and shaken with 6 grams of a copper-chromite catalyst at 264° C. for 21 hours at pressures between 220 and 350 atmospheres while hydrogen is passed therethrough. Almost 0.6 mol of hydrogen was absorbed.

This preparation was repeated at 292° C. In this case constant pressure was reached in five hours.

The products of these hydrogenations included methanol, propyl cyclohexanol, two isomeric glycols ($C_9H_{18}O_2$), higher boiling glycols, ethers, and resinous products. The mixtures of products obtained are colorless to yellow.

The herein disclosed process of converting lignin to compounds of lower molecular weight makes available for the production of various organic compounds a source of cheap material which is essentially a waste product at the present time. The products formed directly by the process are useful as solvents and as materials for the synthesis of other organic compounds.

I claim:

1. The process of reacting lignin with hydrogen which comprises heating lignin with hydrogen under pressure in the presence of a copper oxide-containing hydrogenation catalyst.

2. The process of converting lignin into oxygenated compounds of lower molecular weight which comprises heating lignin, in a solvent inert to hydrogen, with hydrogen under pressure in the presence of a copper oxide-containing hydrogenation catalyst.

3. The process of converting lignin into compounds of lower molecular weight which comprises heating lignin, in a solvent inert to hydrogen, with hydrogen under a pressure of 50 to 500 atmospheres in the presence of a copper oxide-containing hydrogenation catalyst at a temperature of 200–350° C.

4. The process of hydrogenating lignin which comprises heating lignin at 250–300° C. in a solvent inert to hydrogen under a hydrogen pressure of 150 to 400 atmospheres in the presence of a copper-chromite catalyst.

5. A process of converting lignin into p-propyl cyclohexanol, 4-propyl 1,2-dihydroxy cyclohexane, 3-p-hydroxy cyclohexyl propanol-1, and higher boiling glycols which consists of treating lignin to the action of hydrogen and a suitable catalyst consisting of copper chromium oxide at temperatures between about 200° C. and about 350° C. and pressures of about 3500 to about 6000 pounds for such time as to assure completion of the hydrogenation reaction, thence removal of the mixture from the container, thence recovery of the catalyst as by centrifuging, thence separation of the p-propyl cyclohexane, 4-propyl 1,2-dihydroxy cyclohexane, 3-p-hydroxy cyclohexyl propanol-1, and the higher boiling glycols.

6. The process of converting lignin into oxygenated compounds of lower molecular weight which comprises heating lignin, in an organic solvent inert to hydrogen, with hydrogen under pressure in the presence of a copper oxide-containing hydrogenation catalyst.

7. The process of converting lignin into compounds of lower molecular weight which comprises heating lignin, in an organic solvent inert to hydrogen, with hydrogen under a pressure of 50 to 500 atmospheres in the presence of a copper oxide-containing hydrogenation catalyst at a temperature of 200–350° C.

8. The process of hydrogenating lignin which comprises heating lignin at 250–300° C. in an organic solvent inert to hydrogen under a hydrogen pressure of 150 to 400 atmospheres in the presence of a copper-chromite catalyst.

HOMER ADKINS.